United States Patent
Cheng et al.

(10) Patent No.: US 12,488,200 B2
(45) Date of Patent: Dec. 2, 2025

(54) METHOD AND APPARATUS FOR ADDING VIDEO EFFECT, DEVICE, AND STORAGE MEDIUM

(71) Applicant: BEIJING YOUZHUJU NETWORK TECHNOLOGY CO., LTD., Beijing (CN)

(72) Inventors: Shanbo Cheng, Beijing (CN); Mingxuan Wang, Beijing (CN); Lei Li, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 192 days.

(21) Appl. No.: 18/562,946

(22) PCT Filed: May 12, 2022

(86) PCT No.: PCT/CN2022/092392
§ 371 (c)(1),
(2) Date: Nov. 21, 2023

(87) PCT Pub. No.: WO2022/242535
PCT Pub. Date: Nov. 24, 2022

(65) Prior Publication Data
US 2024/0370663 A1 Nov. 7, 2024

(30) Foreign Application Priority Data
May 21, 2021 (CN) .......................... 202110560294.3

(51) Int. Cl.
*G06F 40/40* (2020.01)
(52) U.S. Cl.
CPC .................................. *G06F 40/40* (2020.01)

(58) Field of Classification Search
USPC ...................................................... 704/1–504
See application file for complete search history.

(56) References Cited

U.S. PATENT DOCUMENTS

| 2018/0143975 | A1* | 5/2018 | Casal | ....................... G06F 40/51 |
| 2020/0302124 | A1* | 9/2020 | Cai | .......................... G06F 40/20 |

(Continued)

FOREIGN PATENT DOCUMENTS

| CN | 1801141 A | 7/2006 |
| CN | 101320366 A | 12/2008 |

(Continued)

OTHER PUBLICATIONS

Cao, Qian, and Deyi Xiong. "Encoding gated translation memory into neural machine translation." Proceedings of the 2018 Conference on Empirical Methods in Natural Language Processing. 2018.

(Continued)

*Primary Examiner* — Marcus T Riley (57) ABSTRACT

A translation method, a translation apparatus, a translation device, and a storage medium are provided. The method includes: firstly, determining the second source sentence semantically similar to the first source sentence, then determining the target source word used in both of the first source sentence and the second source sentence, and if translated words for the target source word in the first source sentence and the second source sentence are different, determining the target translated word for the target source word according to the probability of the target source word being translated into the first translated word or the second translated word. Thus, the translation method uses not only the information of a second translated sentence for the second source sentence but also the information of the second source sentence. The translation of the first source sentence is corrected according to the information of similar words.

12 Claims, 2 Drawing Sheets

(56) References Cited

U.S. PATENT DOCUMENTS

| | | | | |
|---|---|---|---|---|
| 2024/0370663 A1* | 11/2024 | Cheng | ................... | G06F 40/30 |
| 2025/0190717 A1* | 6/2025 | Zhuang | ................... | G06N 5/02 |

FOREIGN PATENT DOCUMENTS

| CN | 2011095802 A | 5/2011 |
|---|---|---|
| CN | 103729347 A | 4/2014 |
| CN | 107977356 A | 5/2018 |
| CN | 108874785 A | 11/2018 |
| CN | 109359304 A | 2/2019 |
| CN | 109710952 A | 5/2019 |
| CN | 110175336 A | 8/2019 |
| CN | 110991196 A | 4/2020 |
| CN | 111401080 A | 7/2020 |
| CN | 113191163 A | 7/2021 |

OTHER PUBLICATIONS

International Search Report issued Aug. 11, 2022 in PCT Appl. No. PCT/CN2022/092392, English translation (15 pages).
Written Opinion for International Application No. PCT/CN2022/092392, mailed Aug. 11, 2022, 8 Pages.

* cited by examiner

METHOD AND APPARATUS FOR ADDING VIDEO EFFECT, DEVICE, AND STORAGE MEDIUM

CROSS-REFERENCE TO RELATED APPLICATION

The present application claims priority of the Chinese Patent Application No. 202110560294.3 filed with China National Intellectual Property Administration on May 21, 2021, and entitled "Translation Method, Translation Apparatus, Translation Device and Storage Medium", the entire disclosure of which is incorporated herein by reference as the present disclosure.

TECHNICAL FIELD

The present disclosure relates to the field of machine learning, and in particular, to a translation method, a translation apparatus, a translation device and a storage medium.

BACKGROUND

With the rapid development of the computer technology, a lot of technical progress has been made in the field of machining learning. In the field of machining learning, typically, a neural network model is trained to replace repeated manual operations. At present, machining learning can also be applied to the field of translation, and a neural network model can be trained for translation.

Neural machine translation (NMT) is high in translation quality and has become the most extensive machine translation technology at present. The translation process is mainly as follows: a source sentence s is input to NMT; the source sentence s is encoded as a vector by an encoder in the NMT; model translation is then performed on the vector of the source sentence s to obtain a vector of a translated sentence t for the source sentence s; and the vector of the translated sentence t is decoded using a decoder to obtain the translated sentence t.

However, in the prior art, there is the problem of incorrect translation in the translation process.

SUMMARY

To solve the problem of incorrect translation in the translation process in the prior art, embodiments of the present disclosure provide a translation method that can improve the accuracy of translation.

Embodiments of the present disclosure provide a translation method, which includes:
  obtaining a target sentence pair, the target sentence pair includes a first source sentence and a first translated sentence, and the first translated sentence is a translation of the first source sentence;
  obtaining a reference sentence pair according to the first source sentence, the reference sentence pair includes a second source sentence and a second translated sentence; the second source sentence is semantically similar to the first source sentence, and the second translated sentence is a translation of the second source sentence;
  determining a target source word included in the first source sentence, the target source word also belongs to the second source sentence;
  in response to a first translated word being different from a second translated word, determining a target translated word for the target source word according to a first probability and a second probability of the target source word, the first translated word is a word corresponding to the target source word in the first translated sentence; the second translated word is a word corresponding to the target source word in the second translated sentence; the first probability is a probability of the target source word being translated into the first translated word in the first translated sentence; and the second probability is a probability of the target source word being translated into the second translated word in the second translated sentence; and
  determining a target translated sentence for the first source sentence according to the target translated word for the target source word.

Optionally, determining a target translated word for the target source word according to a first probability and a second probability of the target source word includes at least one of:
  in response to the first probability being less than the second probability, determining the second translated word as the target translated word for the target source word;
  in response to the first probability being greater than the second probability, determining the first translated word as the target translated word for the target source word; and
  in response to the first probability being equal to the second probability, determining the first translated word or the second translated word as the target translated word for the target source word.

Optionally, the method further includes:
  inputting the first source sentence to a translation model to obtain the first probability output by the translation model.

Optionally, the method further includes:
  inputting the second source sentence and the second translated sentence to the translation model to obtain the second probability output by the translation model.

Optionally, determining a target translated word for the target source word according to a first probability and a second probability of the target source word includes:
  obtaining a fourth probability according to the second probability and a third probability, the third probability is a probability of the target source word being translated into the second translated word that is obtained by inputting the first source sentence to the translation model; and
  determining the target translated word for the target source word according to the first probability and the fourth probability.

Embodiments of the present disclosure further provide a translation apparatus, the apparatus includes:
  a first obtaining unit configured to obtain a target sentence pair, the target sentence pair includes a first source sentence and a first translated sentence, and the first translated sentence is a translation of the first source sentence;
  a second obtaining unit configured to obtain a reference sentence pair according to the first source sentence, the reference sentence pair includes a second source sentence and a second translated sentence; the second source sentence is semantically similar to the first source sentence, and the second translated sentence is a translation of the second source sentence;

a first determination unit configured to determine a target source word included in the first source sentence, the target source word also belongs to the second source sentence;

a second determination unit configured to, in response to a first translated word being different from a second translated word, determine a target translated word for the target source word according to a first probability and a second probability of the target source word, the first translated word is a word corresponding to the target source word in the first translated sentence; the second translated word is a word corresponding to the target source word in the second translated sentence; the first probability is a probability of the target source word being translated into the first translated word in the first translated sentence; and the second probability is a probability of the target source word being translated into the second translated word in the second translated sentence; and a third determination unit configured to determine a target translated sentence for the first source sentence according to the target translated word for the target source word.

Optionally, the second determination unit determining a target translated word for the target source word according to a first probability and a second probability of the target source word includes at least one of:

in response to the first probability being less than the second probability, the second determination unit determining the second translated word as the target translated word for the target source word;

in response to the first probability being greater than the second probability, the second determination unit determining the first translated word as the target translated word for the target source word; and in response to the first probability being equal to the second probability, the second determination unit determining the first translated word or the second translated word as the target translated word for the target source word.

Optionally, the apparatus further includes:

a first input unit configured to input the first source sentence to a translation model to obtain the first probability output by the translation model.

Optionally, the apparatus further includes:

a second input unit configured to input the second source sentence and the second translated sentence to the translation model to obtain the second probability output by the translation model.

Optionally, the second determination unit determining a target translated word for the target source word according to a first probability and a second probability of the target source word includes:

the second determination unit obtaining a fourth probability according to the second probability and a third probability, the third probability is a probability of the target source word being translated into the second translated word that is obtained by inputting the first source sentence to the translation model; and the second determination unit determining the target translated word for the target source word according to the first probability and the fourth probability.

Embodiments of the present disclosure further provide a translation device, and the translation device includes a processor and a memory;

the memory is configured to store instructions; and the processor is configured to execute the instructions on the memory to perform the translation method according to above embodiments.

Embodiments of the present disclosure further provide a computer-readable storage medium, which includes instructions which, upon running on a computer, cause the computer to perform the translation method according to above embodiments.

An embodiment of the present disclosure provides a translation method, including: firstly, determining the second source sentence semantically similar to the first source sentence, then determining the target source word which appears in both of the first source sentence and the second source sentence, and if translated words for the target source word in the first source sentence and the second source sentence are different, determining the target translated word for the target source word according to the probability of the target source word being translated into the first translated word or the second translated word. Thus, the translation method in the embodiments of the present disclosure uses not only the information of a second translated sentence for the second source sentence but also the information of the second source sentence. The translation of the first source sentence is corrected according to the information of similar words in the second source sentence and the first source sentence so that the accuracy of translation can be improved.

BRIEF DESCRIPTION OF THE DRAWINGS

To explain the technical solutions in the embodiments of the present disclosure or in the prior art more clearly, the accompanying drawings required for describing the embodiments or the prior art will be briefly described below. Apparently, the accompanying drawings in the following description show some embodiments of the present disclosure, and a person of ordinary skill in the art can derive other drawings from these accompanying drawings without creative work.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

With the rapid development of the computer technology, a lot of technical progress has been made in the field of machining learning. In the field of machining learning, typically, a neural network model is trained to replace repeated manual operations. At present, machining learning can also be applied to the field of translation, and a neural network model can be trained for translation.

Neural machine translation (NMT) is high in translation quality and has become the most extensive machine translation technology at present. The translation process is mainly as follows: a source sentence s is input to NMT; the source sentence s is encoded as a vector by an encoder in the NMT; subsequently, a similar sentence s' semantically similar to the source sentence s is searched for to obtain a similar translated sentence t' for the similar sentence s'; an additional encoder is introduced in the NMT to encode the similar translated sentence t' as a vector; model translation is performed on the vector of the source sentence s and the similar translated sentence t' to obtain a vector of a translated sentence t for the source sentence s; and the vector of the translated sentence t is decoded using a decoder to obtain the translated sentence t.

After study, the inventors have found that when translation is performed in the prior art, reference is made only to the information of the similar translated sentence t' and the information of the similar sentence s' to the source sentence s is neglected, leading to the problem of incorrect translation in the translation process. Moreover, to perform translation in the prior art, a new encoder needs to be additionally introduced to encode the similar translated sentence t'. Accordingly, the number of parameters during the model calculation is increased and the translation cost is increased. If the information of the similar sentence s' is considered, a translation model needs to be retrained, which is time-consuming.

Therefore, an embodiment of the present disclosure provides a translation method, including: firstly, determining a second source sentence semantically similar to a first source sentence, then determining a target source word used in both of the first source sentence and the second source sentence, and if translated words for the target source word in the first source sentence and the second source sentence are different, determining a target translated word for the target source word according to a probability of the target source word being translated into a first translated word or a second translated word. Thus, the translation method in the embodiments of the present disclosure uses not only the information of a second translated sentence for the second source sentence but also the information of the second source sentence. The translation of the first source sentence is corrected according to the information of similar words in the second source sentence and the first source sentence so that the accuracy of translation can be improved. Moreover, the translation method in the embodiments of the present disclosure does not require introduction of a new encoder in a translation model to encode the translated sentence t' as a vector, thereby reducing the translation cost and improving the translation efficiency.

Figure 1:
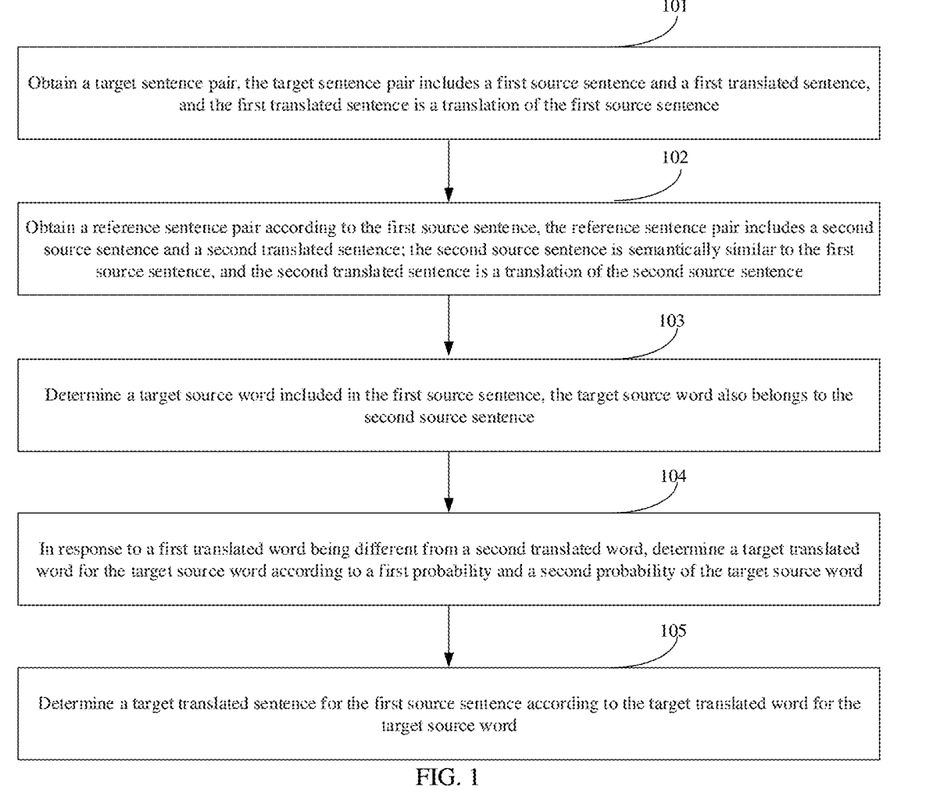
FIG. 1 is a flowchart of a translation method provided in an embodiment of the present disclosure.

FIG. 1 is a flowchart of a translation method provided in an embodiment of the present disclosure.

The translation method provided in the embodiment includes the following steps.

S101, obtaining a target sentence pair.

In an embodiment of the present disclosure, a target sentence pair is obtained. The target sentence pair is a sentence pair after translation by a translation model. The target sentence pair includes a first source sentence and a first translated sentence. The first translated sentence is a sentence obtained by translating the first source sentence using the translation model. The first translated sentence may have a translation error.

As an example, the first source sentence may be "她是一个来自中国的学生", and the first translated sentence may be "She is a student to China", the word "to" in the first translated sentence is a translation error.

The translation model used in the embodiments of the present disclosure may be a neural machine translation (NMT) model.

S102, obtaining a reference sentence pair according to the first source sentence.

In an embodiment of the present disclosure, a reference sentence pair is obtained according to the first source sentence. The reference sentence pair includes a second source sentence and a second translated sentence, the second translated sentence is a translation of the first source sentence, and the second translated sentence is a correct translation of the first source sentence. The first source sentence is semantically similar to the second source sentence, and the second source sentence semantically similar to the first source sentence may be searched for in a translation memory.

In practical use, the first source sentence and the second source sentence are semantically similar. Semantic similarity may be achieved in the following two ways: the first one is to obtain a proportion of similar words in the first source sentence and the second source sentence by comparison and regard the first source sentence and the second source sentence as semantically similar when the proportion of similar words reaches a predetermined proportion; and the second one is to encode the first source sentence and the second source sentence as vectors, then calculate a similarity between the vectors, and regard the first source sentence and the second source sentence as semantically similar when the similarity between the vectors reaches a predetermined proportion.

As an example, the first source sentence may be "她是一个来自中国的学生", and the first translated sentence may be "She is a student to China". The second source sentence may be "他是一个来自美国的老师", and the second translated sentence may be "He is a teacher from America".

S103, determining a target source word included in the first source sentence.

In an embodiment of the present disclosure, the target source word is a word used in both of the first source sentence and the second source sentence. After the second source sentence semantically similar to the first source sentence is determined, words in the first source sentence and the second source sentence may be compared, and a word used in both of the first source sentence and the second source sentence is determined as the target source word.

In practical use, when the target source word in the first source sentence is determined, words in the first source sentence and the second source sentence may be compared one by one to obtain the word used in both of the first source sentence and the second source sentence.

As an example, the first source sentence may be "她是一个来自中国的学生", and the second source sentence may be "他是一个来自美国的老师". By comparing the words one by one, it can be determined that the target source words in the first source sentence are "是", "一个", "来自", and "的".

The target source word may also be not determined by comparing words one by one. For example, the first source sentence and the second source sentence are each grammatical segmented to obtain several parts, and the corresponding parts of the first source sentence and the second source sentence are compared to obtain the target source word.

S104, in response to a first translated word being different from a second translated word, determining a target translated word for the target source word according to a first probability and a second probability of the target source word.

In an embodiment of the present disclosure, the first translated word is a word corresponding to the target source word in the first translated sentence; the second translated word is a word corresponding to the target source word in the second translated sentence; the first probability is a probability of the target source word being translated into the first translated word in the first translated sentence; and the second probability is a probability of the target source word being translated into the second translated word in the second translated sentence. In an embodiment of the present disclosure, the first translated word for the target source word in the first translated sentence may be different from the second translated word for the target source word in the second translated sentence. In this case, the target translated word for the target source word may be determined according to the first probability of the target source word being translated into the first translated word in the first translated sentence and the second probability of the target source word being translated into the second translated word in the second translated sentence. The target translated word is a correct translated word corresponding to the target source word. In practical use, the first probability is obtained by inputting the first source sentence to the translation model. The translation process is mainly as follows: the first source sentence is input to the translation model; the first source sentence is encoded as a vector by an encoder in the translation model; a vector of the first translated sentence is obtained by translation; and the vector of the first translated sentence is decoded using a decoder to obtain the first translated sentence. At this time, the probability of the target source word being translated into the first translated word in the first translated sentence is the first probability.

In practical use, the second probability is obtained by inputting the second source sentence and the second translated sentence to the translation model. The second source sentence and the second translated sentence are input to the translation model, and the translation model forcibly decodes the second source sentence and the second translated sentence. That is, the second source sentence and the second translated sentence are encoded as vectors to obtain the second probability of the target source word being translated into the second translated word in the second translated sentence. Thus, the translation method in the embodiments of the present disclosure does not require introduction of a new encoder in the translation model to encode the second translated sentence as a vector and may obtain the second probability by forcibly decoding the second source sentence and the second translated sentence using the original encoder and the decoder in the translation model. That is, the translation method in the embodiments of the present disclosure reduces the translation cost and improves the translation efficiency.

As shown in Table 1, probabilities of words in the first source sentence being translated that are obtained by inputting the first source sentence to the translation model are presented.

TABLE 1

|   | She | is | a | student | to | China |
|---|-----|-----|-----|---------|-----|-------|
| 她 | 0.8 | 0.02 | 0.02 | 0.02 | 0.02 | 0.02 |
| 是 | 0.02 | 0.8 | 0.02 | 0.02 | 0.02 | 0.02 |
| 一个 | 0.1 | 0.1 | 0.7 | 0.03 | 0.03 | 0.04 |
| 来自 | 0.05 | 0.01 | 0.01 | 0.1 | 0.5 | 0.08 |
| 中国 | 0.02 | 0.02 | 0.02 | 0.02 | 0.02 | 0.9 |
| 的 | 0.1 | 0.2 | 0.13 | 0.15 | 0.15 | 0.1 |
| 学生 | 0.02 | 0.02 | 0.02 | 0.9 | 0.02 | 0.02 |

As can be seen from Table 1, the first probability of the target source word "一个" in the first source sentence being translated into "a" is 0.7, the first probability of the target source word "来自" in the first source sentence being translated into "to" is 0.5, and the probability of the target source word "来自" in the first source sentence being translated into "from" is 0.3. In other words, since the probability of the word "来自" in the first source sentence being translated into "to" that is obtained by inputting the first source sentence to the translation model is maximum (0.5), the translation model has a translation error in translating the first source sentence, i.e., mistakenly translates "来自" into "to".

Figure 2:
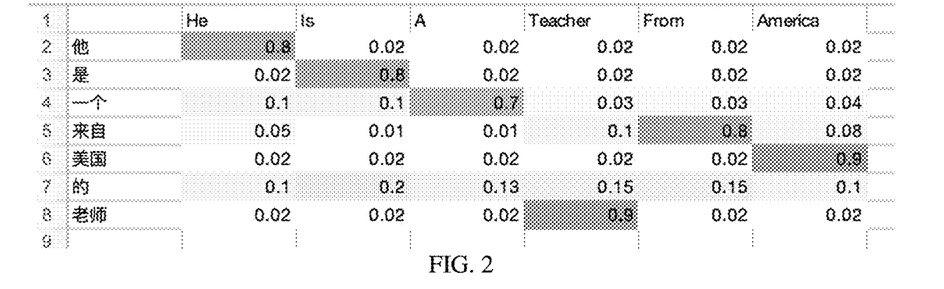
FIG. 2 is a schematic diagram of a translation matrix provided in an embodiment of the present disclosure.

As shown in Table 2 and FIG. 2, probabilities of words in the second source sentence being translated into words in the second translated sentence that are obtained by inputting the second source sentence and the second translated sentence to the translation model are presented.

TABLE 2

|   | He | is | a | teacher | from | America |
|---|-----|-----|-----|---------|------|---------|
| 他 | 0.8 | 0.02 | 0.02 | 0.02 | 0.02 | 0.02 |
| 是 | 0.02 | 0.8 | 0.02 | 0.02 | 0.02 | 0.02 |
| 一个 | 0.1 | 0.1 | 0.7 | 0.03 | 0.03 | 0.04 |
| 来自 | 0.05 | 0.01 | 0.01 | 0.1 | 0.8 | 0.08 |
| 美国 | 0.02 | 0.02 | 0.02 | 0.02 | 0.02 | 0.9 |
| 的 | 0.1 | 0.2 | 0.13 | 0.15 | 0.15 | 0.1 |
| 老师 | 0.02 | 0.02 | 0.02 | 0.9 | 0.02 | 0.02 |

As can be seen from Table 2 or FIG. 2, the probability of the word "他" in the second source sentence being translated into "He" is 0.8, the second probability of the target source word "一个" in the second source sentence being translated into "a" is 0.7, and the second probability of the target source word "来自" in the first source sentence being translated into "from" is 0.8.

In an embodiment of the present disclosure, determining the target translated word for the target source word may be implemented in the following two ways:

In a first possible implementation, there may be the following three cases for determining the target translated word for the target source word according to the first probability and the second probability of the target source word.

The first case is that the first probability is less than the second probability, and the second translated word is determined as the target translated word for the target source word. In other words, if the probability of the target source word being translated into the first translated word is less than the probability of the target source word being translated into the second translated word, the target translated word is the second translated word.

As an example, if the first probability of the target source word "来自" being translated into the first translated word "to" is 0.5 and the second probability of the target source word "来自" being translated into the second translated word "from" is 0.8 (the first probability 0.5 is less than the second probability 0.8), the target translated word for the target source word "来自" is determined as the second translated word "from".

The second case is that the first probability is greater than the second probability, and the first translated word is determined as the target translated word for the target source word. In other words, if the probability of the target source word being translated into the first translated word is greater than the probability of the target source word being translated into the second translated word, the target translated word is the first translated word.

As an example, if the first probability of the target source word "来自" being translated into the first translated word "to" is 0.8 and the second probability of the target source word "来自" being translated into the second translated word "from" is 0.5 (the first probability 0.8 is greater than the second probability 0.5), the target translated word for the target source word "来自" is determined as the first translated word "to".

The third case is that the first probability is equal to the second probability, and the first translated word or the second translated word is determined as the target translated word for the target source word. In other words, if the probability of the target source word being translated into the first translated word is equal to the probability of the target source word being translated into the second translated word, the target translated word is the first translated word or the second translated word.

As an example, if the first probability of the target source word "来自" being translated into the first translated word "to" is 0.7 and the second probability of the target source word "来自" being translated into the second translated word "from" is 0.7 (the first probability 0.7 is equal to the second probability 0.7), the target translated word for the target source word "来自" is determined as the first translated word "to" or the second translated word "from".

In a second possible implementation, a fourth probability is obtained according to the second probability and a third probability, and the target translated word for the target source word is determined according to the first probability and the fourth probability, the third probability is a probability of the target source word being translated into the second translated word that is obtained by inputting the first source sentence to the translation model. In practical use, the fourth probability may be obtained by weighted summation of the second probability and the third probability. The fourth probability is obtained by using the second probability and the third probability to assist with the determination of the target translated word, and the translation quality of the translation method provided in the embodiments of the present disclosure can be improved.

In practical use, the first probability may be compared with the fourth probability, and the translated word corresponding to the greater probability is determined as the target translated word. If the first probability is less than the fourth probability, the second translated word corresponding to the fourth probability is determined as the target translated word. If the first probability is greater than the fourth probability, the first translated word corresponding to the first probability is determined as the target translated word. If the first probability is equal to the fourth probability, the first translated word corresponding to the first probability or the second translated word corresponding to the fourth probability is determined as the target translated word.

As an example, the first source sentence is input to the translation model, and the first probability of the target source word "来白" being translated into the first translated word "to" is 0.5 and the third probability of the target source word "来自" being translated into the second translated word "from" is 0.3. The second source sentence is input to the translation model, the second probability of the target source word "来自" being translated into the second translated word "from" is 0.8. The fourth probability is obtained by weighted summation of the second probability 0.8 and the third probability 0.3, i.e., the fourth probability=(0.8+ 0.3)*0.5=0.55. The fourth probability 0.55 is greater than the first probability 0.5, and the second translated word "from" corresponding to the fourth probability is determined as the target translated word.

S105, determining a target translated sentence for the first source sentence according to the target translated word for the target source word.

In an embodiment of the present disclosure, a target translated sentence for the first source sentence may be determined according to the determined target translated word for the target source word.

As an example, if the first probability of the target source word "米白" being translated into the first translated word "to" is less than the second probability of the target source word "来自" being translated into the second translated word "from", the target translated word for the target source word "来自" is determined as the second translated word "from", and the first translated word "to" in the first translated sentence is corrected to the second translated word "from" to obtain the target translated sentence.

An embodiment of the present disclosure provides a translation method, including: firstly, determining the second source sentence semantically similar to the first source sentence, then determining the target source word which appears in both of the first source sentence and the second source sentence, and if translated words for the target source word in the first source sentence and the second source sentence are different, determining the target translated word for the target source word according to the probability of the target source word being translated into the first translated word or the second translated word. Thus, the translation method in the embodiments of the present disclosure uses not only the information of a second translated sentence for the second source sentence but also the information of the second source sentence. The translation of the first source sentence is corrected according to the information of similar words in the second source sentence and the first source sentence so that the accuracy of translation can be improved. Moreover, the translation method in the embodiments of the present disclosure does not require introduction of a new encoder in a translation model to encode the translated sentence t' as a vector, thereby reducing the translation cost and improving the translation efficiency.

Figure 3:
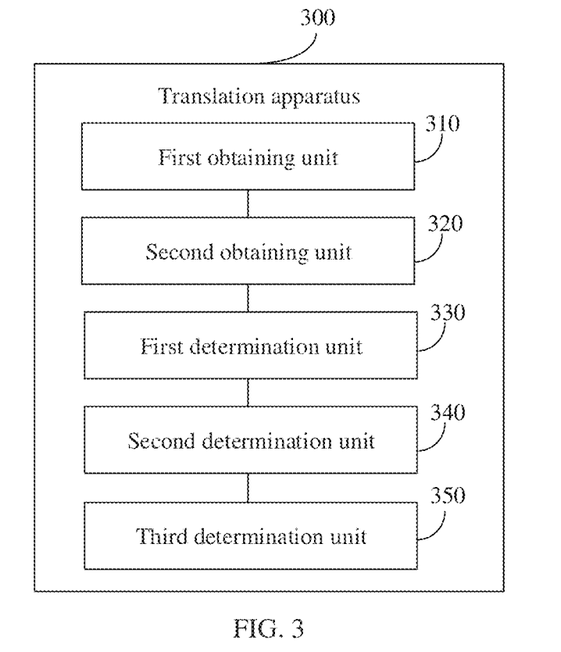
FIG. 3 is a structural block diagram of a translation apparatus provided in an embodiment of the present disclosure.

Based on a translation method provided in the foregoing embodiment, an embodiment of the present disclosure further provides a translation apparatus. The working principle of the translation apparatus is described in detail below with reference to the accompanying drawings.

FIG. 3 is a structural block diagram of a translation apparatus provided in an embodiment of the present disclosure.

The translation apparatus 300 provided in the embodiment includes:
   a first obtaining unit 310 configured to obtain a target sentence pair, the target sentence pair includes a first source sentence and a first translated sentence, and the first translated sentence is a translation of the first source sentence;

a second obtaining unit 320 configured to obtain a reference sentence pair according to the first source sentence, the reference sentence pair includes a second source sentence and a second translated sentence; the second source sentence is semantically similar to the first source sentence, and the second translated sentence is a translation of the second source sentence;

a first determination unit 330 configured to determine a target source word in the first source sentence, the target source word is a word used in both of the first source sentence and the second source sentence;

a second determination unit configured 340 to, in response to a first translated word being different from a second translated word, determine a target translated word for the target source word according to a first probability and a second probability of the target source word, the first translated word is a word corresponding to the target source word in the first translated sentence; the second translated word is a word corresponding to the target source word in the second translated sentence; the first probability is a probability of the target source word being translated into the first translated word in the first translated sentence; and the second probability is a probability of the target source word being translated into the second translated word in the second translated sentence; and a third determination unit 350 configured to determine a target translated sentence for the first source sentence according to the target translated word for the target source word.

Optionally, the determining, by the second determination unit, a target translated word for the target source word according to a first probability and a second probability of the target source word includes at least one of:

in response to the first probability being less than the second probability, determining, by the second determination unit, the second translated word as the target translated word for the target source word;

in response to the first probability being greater than the second probability, determining, by the second determination unit, the first translated word as the target translated word for the target source word; and in response to the first probability being equal to the second probability, determining, by the second determination unit, the first translated word or the second translated word as the target translated word for the target source word.

Optionally, the translation apparatus further includes:
a first input unit configured to input the first source sentence to a translation model to obtain the first probability.

Optionally, the translation apparatus further includes:
a second input unit configured to input the second source sentence and the second translated sentence to the translation model to obtain the second probability.

Optionally, the second determination unit, determining a target translated word for the target source word according to a first probability and a second probability of the target source word includes:

the second determination unit obtaining a fourth probability according to the second probability and a third probability, the third probability is a probability of the target source word being translated into the second translated word that is obtained by inputting the first source sentence to the translation model; and the second determination unit determining the target translated word for the target source word according to the first probability and the fourth probability.

Figure 4:
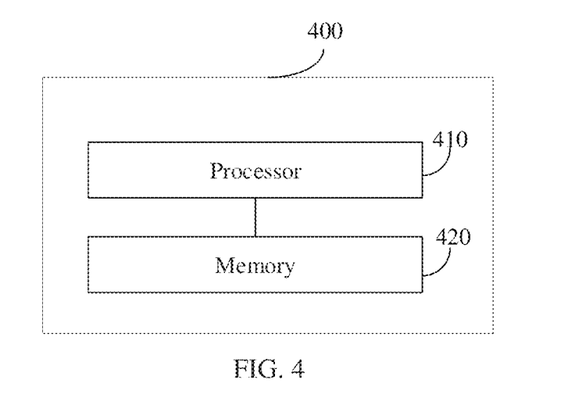
FIG. 4 is a structural block diagram of a translation device provided in an embodiment of the present disclosure.

Based on a translation method provided in the foregoing embodiment, an embodiment of the present disclosure further provides a translation device. The translation device 400 includes:

a processor 410 and a memory 420. The number of processors may be one or more. In some embodiments of the present disclosure, the processor and the memory may be connected by means of a bus or in other ways.

The memory may include a read-only memory (ROM) and a random-access memory (RAM) and provide instructions and data for the processor. A part of the memory may further include a non-volatile RAM (NVRAM). The memory stores an operating system, operation instructions, executable modules, or data structures, or subsets thereof, or extended sets thereof, the operation instructions may include various operation instructions for implementing various operations. The operating system may include various system programs for implementing various basic services and processing tasks based on hardware.

The processor controls operations of a terminal device. The processor may also be referred to as a central processing unit (CPU).

The translation method disclosed in the foregoing embodiment of the present disclosure may be applied to the processor or implemented by the processor. The processor may be an integrated circuit (IC) chip and is capable of signal processing. During the implementation, the steps of each method may be performed through an integrated logic circuit of hardware in a processor or through instructions in the form of software. The processor may be a general-purpose processor, a digital signal processor (DSP), an application-specific integrated circuit (ASIC), a field-programmable gate array (FPGA), another programmable logic device, a discrete gate or transistor logic device, or a discrete hardware component. The processor can implement or execute the methods, steps, and logical block diagrams disclosed in the embodiments of the present disclosure. The general-purpose processor may be a microprocessor, or the processor may be any conventional processor, etc. The steps of the methods disclosed in the embodiments of the present disclosure may be directly executed by a hardware decoding processor, or executed by a combination of hardware and software modules in the decoding processor. The software module may be located in a mature storage medium in the art, such as a random-access memory, a flash memory, a read-only memory, a programmable read-only memory, an electrically erasable programmable memory, or a register. The storage medium is located in the memory. The processor reads the information in the memory, and completes the steps of the foregoing method in combination with hardware in the processor.

An embodiment of the present disclosure further provides a computer-readable storage medium for storing a program code. The program code is configured to perform any implementation in a translation method in the foregoing embodiment.

When the elements of each embodiment of the present disclosure are introduced, articles "a", "an", "this", and "the" are intended to represent one or more elements. The words "include", "comprise", and "have" are inclusive and mean that there may also be other elements in addition to the elements listed.

It needs to be noted that a person of ordinary skill in the art can understand that all or some of processes for implementing the foregoing embodiments can be completed by a computer program instructing relevant hardware. The program may be stored on a computer-readable storage medium. When the program is executed, the processes of the foregoing embodiments may be performed. The storage medium may be a magnetic disk, an optical disc, a read-only memory (ROM), a random-access memory (RAM), or the like.

The embodiments in the specification are described in a progressive manner. For same or similar parts between embodiments, reference may be made to each other. Each embodiment focuses on a difference from other embodiments. In particular, for the apparatus embodiments, since they correspond to the method embodiments, the description is relatively simple, and reference can be made to the description of the method embodiments. The apparatus embodiments described above are merely exemplary, the units and modules illustrated as separate components may be or may not be physically separated. In addition, some or all of the units and modules may be selected according to actual needs to achieve the objectives of the solutions of the embodiments. Those of ordinary skill in the art can understand and implement the present disclosure without making the inventive effort.

The foregoing are merely descriptions of the specific embodiments of the present disclosure. It should be noted that improvements and modifications can be made by those of ordinary skill in the art without departing from the principles of the present disclosure, and these improvements and modifications should also be considered as falling within the protection scope of the present disclosure.

The invention claimed is:

1. A translation method, comprising:
obtaining a target sentence pair, wherein the target sentence pair comprises a first source sentence and a first translated sentence, and the first translated sentence is a translation of the first source sentence;
obtaining a reference sentence pair according to the first source sentence, wherein the reference sentence pair comprises a second source sentence and a second translated sentence, the second source sentence is semantically similar to the first source sentence, and the second translated sentence is a translation of the second source sentence;
determining a target source word comprised in the first source sentence, wherein the target source word also belongs to the second source sentence;
in response to a first translated word being different from a second translated word, determining a target translated word for the target source word according to a first probability and a second probability of the target source word, wherein the first translated word is a word corresponding to the target source word in the first translated sentence; the second translated word is a word corresponding to the target source word in the second translated sentence, the first probability is a probability of the target source word being translated into the first translated word in the first translated sentence, and the second probability is a probability of the target source word being translated into the second translated word in the second translated sentence; and
determining a target translated sentence for the first source sentence according to the target translated word for the target source word.

2. The method according to claim 1, wherein the determining the target translated word for the target source word according to the first probability and the second probability of the target source word comprises at least one of:
in response to the first probability being less than the second probability, determining the second translated word as the target translated word for the target source word;
in response to the first probability being greater than the second probability, determining the first translated word as the target translated word for the target source word; and
in response to the first probability being equal to the second probability, determining the first translated word or the second translated word as the target translated word for the target source word.

3. The method according to claim 1, further comprising:
inputting the first source sentence to a translation model to obtain a first probability output by the translation model.

4. The method according to claim 1, further comprising:
inputting the second source sentence and the second translated sentence to a translation model to obtain a second probability output by the translation model.

5. The method according to claim 3, wherein the determining a target translated word for a target source word according to the first probability and the second probability of the target source word comprises:
obtaining a fourth probability according to the second probability and a third probability, wherein the third probability is a probability of the target source word being translated into the second translated word that is obtained by inputting the first source sentence to the translation model; and
determining the target translated word for the target source word according to the first probability and the fourth probability.

6. A translation apparatus, comprising:
a first obtaining unit configured to obtain a target sentence pair, wherein the target sentence pair comprises a first source sentence and a first translated sentence, and the first translated sentence is a translation of the first source sentence;
a second obtaining unit configured to obtain a reference sentence pair according to the first source sentence, wherein the reference sentence pair comprises a second source sentence and a second translated sentence, the second source sentence is semantically similar to the first source sentence, and the second translated sentence is a translation of the second source sentence;
a first determination unit configured to determine a target source word comprised in the first source sentence, wherein the target source word also belongs to the second source sentence;
a second determination unit configured to, in response to a first translated word being different from a second translated word, determine a target translated word for the target source word according to a first probability and a second probability of the target source word, wherein the first translated word is a word corresponding to the target source word in the first translated sentence, the second translated word is a word corresponding to the target source word in the second translated sentence, the first probability is a probability of the target source word being translated into the first translated word in the first translated sentence, and the second probability is a probability of the target source word being translated into the second translated word in the second translated sentence; and a third determination unit configured to determine a target translated sentence for the first source sentence according to the target translated word for the target source word.

7. The apparatus according to claim 6, wherein the second determination unit determining a target translated word for the target source word according to the first probability and the second probability of the target source word comprises at least one of:
in response to the first probability being less than the second probability, the second determination unit determining the second translated word as the target translated word for the target source word;
in response to the first probability being greater than the second probability, the second determination unit determining the first translated word as the target translated word for the target source word; and
in response to the first probability being equal to the second probability, the second determination unit determining the first translated word or the second translated word as the target translated word for the target source word.

8. The apparatus according to claim 6, further comprising:
a first input unit configured to input the first source sentence to a translation model to obtain a first probability output by the translation model.

9. The apparatus according to claim 6, further comprising:
a second input unit configured to input the second source sentence and the second translated sentence to a translation model to obtain a second probability output by the translation model.

10. The apparatus according to claim 8, wherein the second determination unit determining a target translated word for the target source word according to the first probability and the second probability of the target source word comprises:
the second determination unit obtaining a fourth probability according to the second probability and a third probability, wherein the third probability is a probability of the target source word being translated into the second translated word that is obtained by inputting the first source sentence to the translation model; and
the second determination unit determining the target translated word for the target source word according to the first probability and the fourth probability.

11. A translation device, comprising a processor and a memory,
wherein the memory is configured to store instructions; and
the processor is configured to execute the instructions on the memory to perform a translation method, and the method comprises:
obtaining a target sentence pair, wherein the target sentence pair comprises a first source sentence and a first translated sentence, and the first translated sentence is a translation of the first source sentence;
obtaining a reference sentence pair according to the first source sentence, wherein the reference sentence pair comprises a second source sentence and a second translated sentence, the second source sentence is semantically similar to the first source sentence, and the second translated sentence is a translation of the second source sentence;
determining a target source word comprised in the first source sentence, wherein the target source word also belongs to the second source sentence;
in response to a first translated word being different from a second translated word, determining a target translated word for the target source word according to a first probability and a second probability of the target source word, wherein the first translated word is a word corresponding to the target source word in the first translated sentence; the second translated word is a word corresponding to the target source word in the second translated sentence, the first probability is a probability of the target source word being translated into the first translated word in the first translated sentence, and the second probability is a probability of the target source word being translated into the second translated word in the second translated sentence; and
determining a target translated sentence for the first source sentence according to the target translated word for the target source word.

12. A non-transitory computer-readable storage medium, comprising instructions which, upon running on a computer, cause the computer to perform the translation method according to claim 1.

* * * * *